(12) United States Patent
Lüchinger et al.

(10) Patent No.: US 6,633,007 B1
(45) Date of Patent: Oct. 14, 2003

(54) BALANCE WITH A SWIVELLING OPERATING CONSOLE

(75) Inventors: Paul Lüchinger, Uster (CH); Beat Meister, Greifenses (CH); Alfred Schillig, Grüningen (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/868,149

(22) PCT Filed: Dec. 13, 1999

(86) PCT No.: PCT/IB99/01985

§ 371 (c)(1),
(2), (4) Date: Jun. 15, 2001

(87) PCT Pub. No.: WO00/37902

PCT Pub. Date: Jun. 29, 2000

(30) Foreign Application Priority Data

Dec. 18, 1998 (DE) .......................... 198 58 625

(51) Int. Cl.⁷ .................... G01G 21/00; G01G 21/28
(52) U.S. Cl. .................... 177/126; 177/180; 177/238
(58) Field of Search .................... 177/126, 127, 177/180–182, 238–244

(56) References Cited

U.S. PATENT DOCUMENTS

| 4,601,355 A | 7/1986 | Takahashi | 177/2 |
|---|---|---|---|
| 4,676,327 A | 6/1987 | Luechinger | 177/126 |
| 4,840,239 A | 6/1989 | Slagg | 177/25.14 |
| 4,979,579 A | * 12/1990 | Dardat et al. | 177/180 |
| 5,485,178 A | 1/1996 | Tateyama et al. | 347/5 |
| 6,013,878 A | * 1/2000 | Schwartz et al. | 177/238 |
| 6,037,548 A | * 3/2000 | Baitz et al. | 177/238 |
| 6,441,323 B1 | * 8/2002 | Montagnino et al. | 177/126 |

FOREIGN PATENT DOCUMENTS

| DE | 3939959 | 6/1990 |
|---|---|---|
| DE | 4233395 | 11/1993 |
| EP | 0556473 | 8/1993 |

* cited by examiner

*Primary Examiner*—Randy Gibson
(74) *Attorney, Agent, or Firm*—Friedrich Kueffner

(57) ABSTRACT

A balance (1) has a balance housing (21) and an operator panel (4). The operator panel (4) cooperates with the balance housing (21) and is connected, or connectable, to the latter in such a manner that the operator panel (4) can be folded up from a working position into a rest position (4') by rotation about a pivot axis (A) that runs essentially parallel to the balance housing (21). The mechanical connection is made through a pivoting arrangement which allows the operator panel (4) to rest firmly on a supporting surface, independent of the level adjustment of the balance housing (21). Furthermore, the operator panel (4) is configured to be completely detachable from the balance housing (21). Electrical signals are transmitted either through a cable or by a wireless mode of communication.

16 Claims, 2 Drawing Sheets

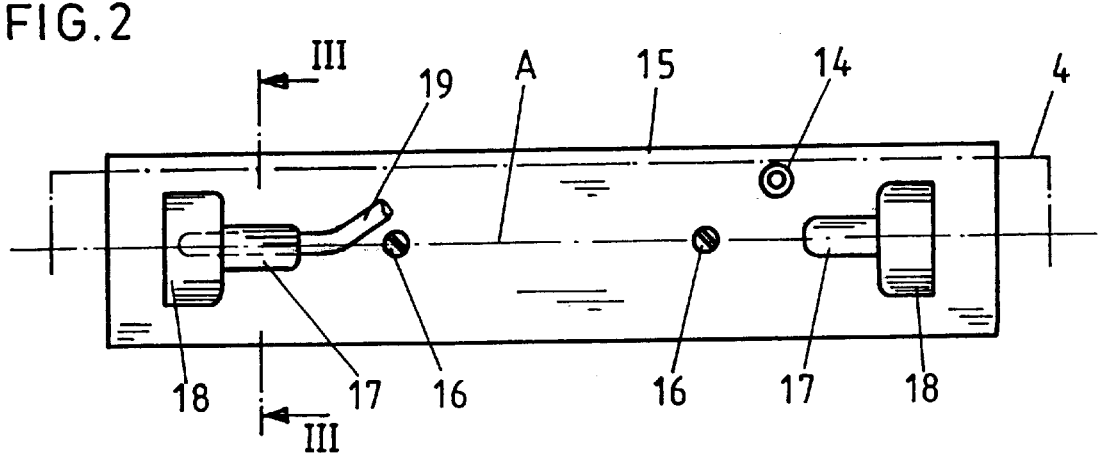
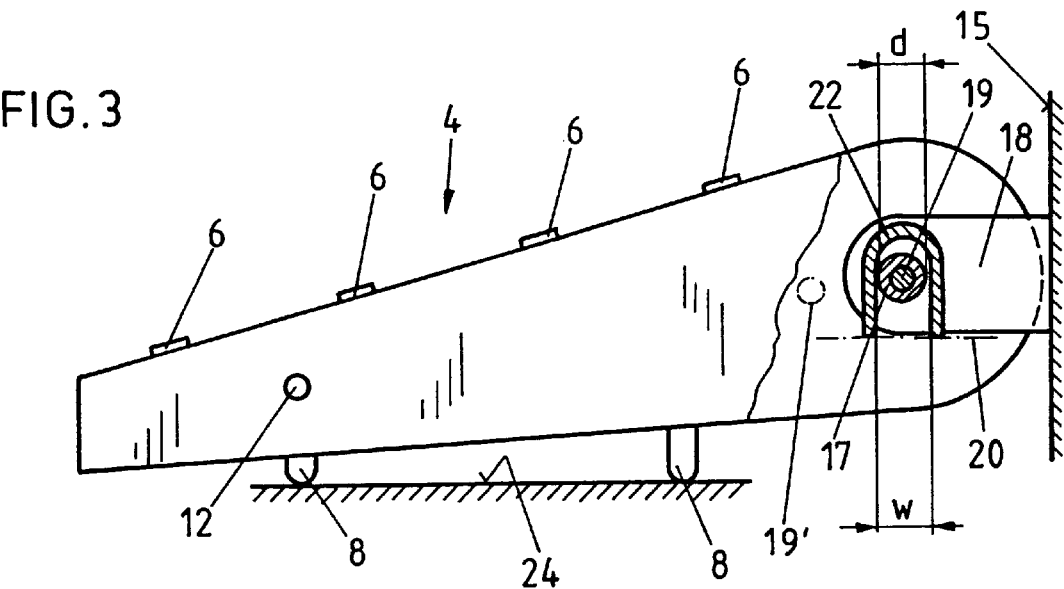

BALANCE WITH A SWIVELLING OPERATING CONSOLE

BACKGROUND OF THE INVENTION

The present invention relates to a balance with a balance housing and an operator panel that is attached or attachable to the balance in such a way that it projects forward from the balance housing towards the operator. A balance of this kind is known, e.g., from DE-A-39 39 959.

Operator panels of the kind described in the aforementioned reference are used to a growing extent for managing all of the possible inputs into the balance, using the most advanced kinds of entry means. To the extent that electronic entry means are used, the heat generated by the operator panel may be detrimental to the weighing results, particularly in the case of analytical balances and microbalances. It is to be understood that the invention covers all possible entry means.

One should also consider that balances equipped with these kinds of panels are often used in laboratories for weighing chemical substances, i.e., in an environment where cleanliness is an important requirement. Yet, with permanently attached operator panels of a state of the art as documented, e.g., in EP-A-0 556 473, it is necessary to move the entire balance out of place in order to clean the area underneath, even if the substance to be cleaned away has accumulated only under the operator panel. However, if the balance has been moved, it is often necessary to level it again afterwards, which is time-consuming and labor-intensive.

An improvement in this respect can be found in the aforementioned DE-A-39 39 959 describing an operator panel which can at least be swiveled about a vertical axis of rotation, so that the operator panel moves around the draft shield, but is otherwise firmly connected to the housing. According to the disclosure, the conceptual idea appears to be that the operator panel, which forms an integral unit with the body of the balance, is configured so that its front edge rests on a support surface. However, this supportive contact is not assured when the level of the balance is adjusted. If the level of the balance is raised, a gap or spatial separation occurs below the front edge of the operator panel so that the latter is no longer firmly supported from below. This is a particularly undesirable condition if the operator panel has at least one key that is operated by applying a pressure force perpendicular to the top surface of the panel. The pressure force acting on the key produces a tilting moment that may be detrimental to the accuracy of the weighing result and in any case introduces a bias into the distribution of forces acting on the balance housing.

Thus, as is evident from the preceding discussion, a number of disadvantages can be associated with state-of-the-art balances.

SUMMARY OF THE INVENTION

It is therefore the object of the present invention to find a design that eliminates at least a part, but preferably all, of the aforementioned disadvantages that stand in the way of improving the accuracy and operating convenience of a balance.

The invention provides an unexpectedly simple solution of the problem and eliminates the diverse drawbacks of the prior art by proposing a concept according to the features of claim 1.

Not only are the aforementioned deficiencies eliminated but, as an additional advantage, the inventive balance is easier to transport, because it forms a more compact unit when the operator panel is in its rest position. Furthermore, the balance requires less storage space.

The term "pivoting arrangement" or "pivot means" as used within this description is meant to imply that the invention is not limited to the operator panel being rotatable about a single geometric axis but rather that the axis itself, too, can tilt and swivel.

In an advantageous embodiment of the invention, the pivot means comprises on one of the pivotally connected parts an axle in the particular shape of a short peg and on the other of the pivotally connected parts a rimmed opening that receives the axle with loose play. On the one hand, the play between the parts is effective in preventing the heat transfer from the operator panel to the balance housing. On the other hand, it also implies that the connection can have horizontal as well as vertical play. In any event, it is preferable to have at least vertical play, so that the connection provides enough mechanical freedom that the balance can more easily be leveled (i.e., height-adjusted) without making a simultaneous height adjustment of the operator panel. With the pivoting arrangement allowing the operator panel to rotate vertically, the latter can adjust itself to a possibly sloping support surface, e.g., a tabletop.

If the rimmed opening is about U-shaped so that the axle peg can slide out through the open side of the U, this will make it easier to remove the operator panel, e.g., in order to replace it with a different type of panel, or for repair and maintenance. If desired, the operator panel may even be detached when the balance is stored away.

Particularly in laboratories where chemicals can get spilled, it is important that an electrical connection, as it is generally provided for the operator panel, is still protected from the possibly destructive effects of spilled chemicals, even with the pivotal connection between the operator panel and the balance housing. The protection from spilled chemicals is advantageously accomplished by providing a connecting cable that exits from the balance housing in the vicinity of the pivot means, because this allows the connection to be kept relatively short so that the cable does not need to rest on the supporting surface.

In a preferred embodiment, the cable is at least approximately coaxial to the pivot axle and runs through the latter so that the cable is subjected to as little bending as possible.

As another measure to facilitate replacing or removing the operator panel from the balance housing, the cable leaves the balance housing through a cover lid, particularly a plate-shaped cover, that is removable from the balance housing, being connected to the latter through a releasable fastening element.

Further details of the invention are presented in the following description of a particularly preferred embodiment as shown schematically in the drawing.

BRIEF DESCRIPTION OF THE DRAWING

FIG. 2 represents a front view of a detail of the balance housing in the direction indicated by the arrow I of FIG. 1; and FIG. 3 represents a side view of the operator panel, in part with a sectional view in the cross-sectional plane indicated by the line III—III of FIG. 2.

DETAILED DESCRIPTION OF THE INVENTION

Figure 1:
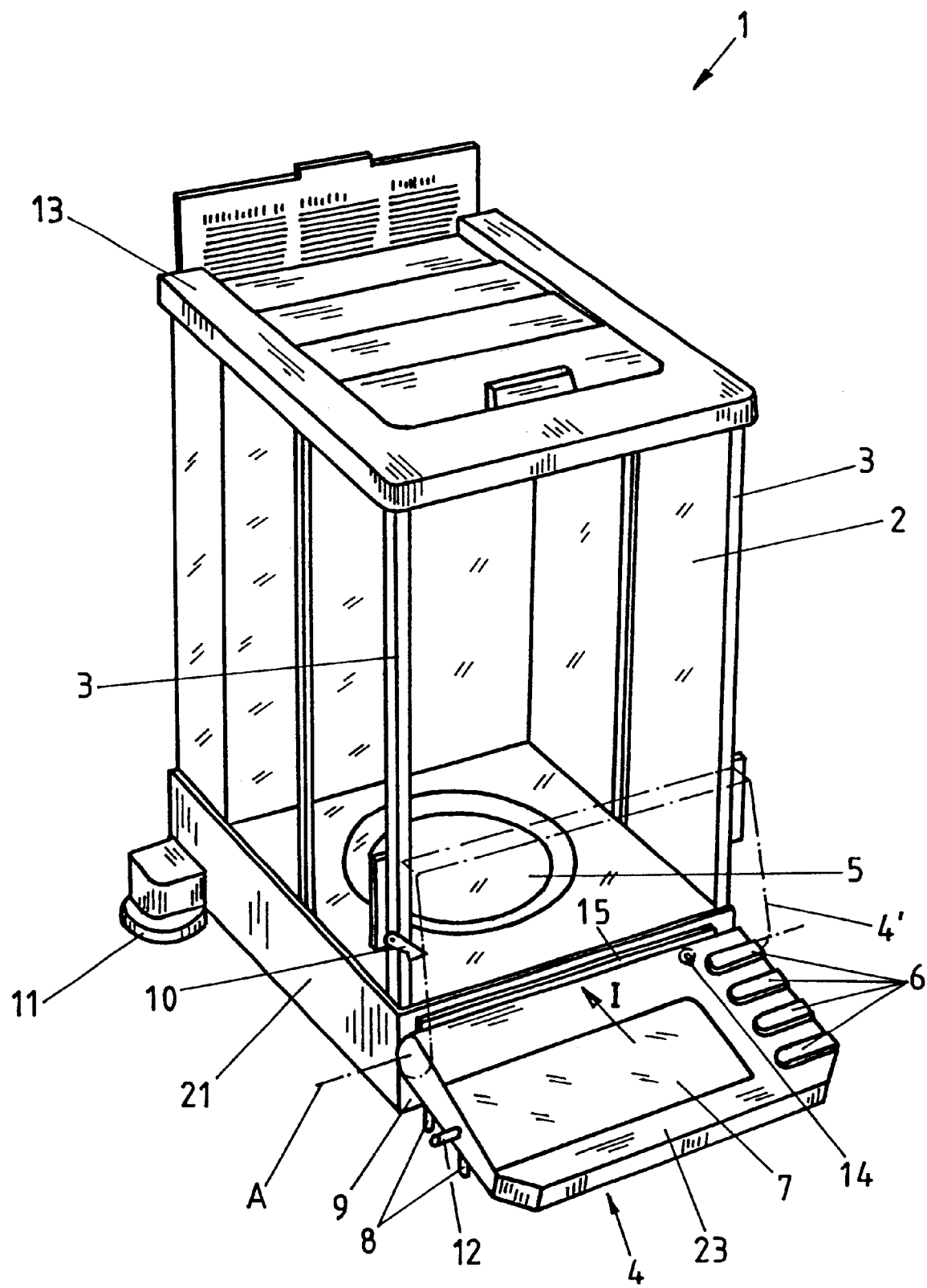
FIG. 1 represents a perspective view of a balance according to the invention.

A balance 1 with a weighing pan 5 has a draft shield 2 resting on a balance housing 21. The draft shield 2 has a frame 13 with a top part shaped approximately like the letter U (see FIG. 1) and supported from below by the vertical posts 3. Furthermore, the draft shield 2 has the same configuration as described in detail in the aforementioned European Patent Application EP-A-0 556 473, the contents of which shall herewith be considered as disclosed by reference.

The balance housing 21 that carries the draft shield 2 has at its rear side at least one leveling foot 11 and also has a front side 9 where it is connected to an operator panel 4. In accordance with the invention, the operator panel is pivotally connected to the front side 9 so that it is rotatable at least approximately about a geometric pivot axis A. Thus, it is possible to tilt the operator panel 4 from its working position (shown in solid lines in FIG. 1) to its folded-up rest position (shown in dash-dotted lines) so that the forwardly projecting front border of the panel 4 extends upwards. This has several advantages:

it makes the balance easier to carry when moving it to another place;

it saves space when the balance is put in storage;

in particular, with the operator panel folded up, it makes the area underneath easier to clean.

As a further advantage, the inventive concept slows down the heat transfer from the heat-producing parts of the operator panel 4 to the balance housing 21, because heat can be conducted into the balance housing only through the physical parts of the pivot means that defines the geometric axis A, as will be made particularly clear through the description of FIG. 3.

The operator panel 4 in the illustrated embodiment has four push keys 6 as well as a display screen 7. The display screen 7 may also have touch-sensitive areas that perform input functions. The illustrated embodiment of the operator panel is relatively simple, yet its lengthwise dimension projecting forward from the front side 9 may be considerable. So as not to introduce a tilting moment into the balance housing 21 by pushing against one of the parts 6 or 7, it is practical to provide the operator panel with feet 8. While operator panels with feet are known per se, the feet in the context of the present invention perform a special function. While the height of the balance housing 21 is variable by means of the leveling foot 11 (or the leveling feet 11, if there is more than one), the feet 8 (at least one foot 8 being provided) ensure that the height of the operator panel is invariable regardless of the height of the balance housing 21. In addition, the feet also absorb a possibly occurring tilting moment when a downward-pushing force is applied to the operator panel 4.

As was already mentioned above, the operator panel 4 can be tilted from its working position (shown in solid lines) to its rest position 4' (shown in dash-dotted lines). It is advantageous to provide a locking device or detent for at least one of the two positions in order to hold the operator panel securely in the respective position. In the illustrated embodiment, there is a latch 10 arranged on one of the vertical posts 3, held horizontally by its own weight, e.g., by a rest stop at its underside (not shown). In the rest position 4' of the operator panel, the latch 10 engages a pin 12 that projects from the side of the operator panel 4. This arrangement is shown only on one side in FIG. 1, but it is practical to provide the same arrangements on both sides of the operator panel. Furthermore, it needs to be understood that the illustrated locking device represents only an example and could be replaced by any known kind of locking device. A detent or locking device for the illustrated working position may likewise be advantageous.

There may be a requirement to ensure that the electronic circuitry contained inside the operator panel 4 (e.g., a printed circuit board, as suggested by reference number 23) is not kept under power when the panel is in its rest position 4'. This can be accomplished with a switch 14 mounted on the front side 9 (shown only in a broken line in FIG. 1, but represented more clearly in FIG. 2) that is automatically triggered by the turned-up wall of the operator panel 4 when the latter is folded up into its rest position 4'. In general, the function of the switch will be to turn the circuit off, but some cases may instead involve a switch-over to a different mode where at least a part of the circuit is switched, e.g., to a "stand-by" mode. As a further possibility, the balance 1 itself may remain in an operating mode even with the operator panel folded up into its rest position 4' if the switch 14 is configured to turn off only those functions that are selectable from the operator panel and to switch over at the same time to a basic group of simple functions of the balance 1.

All of the electronic circuitry related to the switch 14 can be accessed at least in part by removing a cover plate 15 that is mounted on the front side 9 of the balance housing 21. In the view of FIG. 1, this cover plate 15 is mostly hidden behind the operator panel, but it is clearly visible in FIG. 2.

The cover plate 15 is attached to the front side 9, e.g., by means of screws 16, so that the cover plate 15 and the front side 9 form a unit even though they can be separated from each other. In principle, a snap or plug connection would be feasible also, but the purpose of the screws is to create a reliable attachment to the balance housing 21 that cannot accidentally break loose.

FIG. 2 represents a frontal view of the cover plate 15 as seen in the direction indicated by the arrow 1 of FIG. 1. The upper contour of the operator panel 4 (which lies in front of the cover plate 15) is indicated only by a dash-dotted outline. To enable the operator panel 4 to be tilted, two pivot pegs 17 are located opposite each other on support arms 18. Given that the operator panel 4 normally contains the electronic circuitry that has already been mentioned, a problem presents itself as to how the cable should be routed. If possible, the cable should not come into contact with the support surface (24 in FIG. 3) on which the balance stands because the support surface is likely to be contaminated. Also, the cable should not be subjected to excessive bending moments when the operator panel 4 is folded up and down between the rest position and the working position. These problems are solved best if the cable 19 exits the balance housing 21 through the front side 9 in the area of the geometric axis A of the pivot means. As illustrated, it is advantageous to take the cable coaxially through one of the pivot pegs 17. In this way, the cable will only be twisted slightly, but not bent, when the operator panel is turned up or down. As indicated in FIG. 2, the cable can be introduced immediately in an upward direction into the interior of the operator panel 4 so that it can never come into contact with chemicals spilled onto the support surface 24.

FIG. 3 shows a side view of the operator panel, partially in the cross-sectional plane indicated by the line III—III of FIG. 2. The feet 8 of the operator panel 4 are resting on the aforementioned horizontal support surface 24. A wall 20, located in front of the cross-sectional drawing plane of FIG. 3, runs slightly to the right of the right end of the left-side pivot peg 17 of FIG. 2 and is therefore indicated by a dash-dotted line in FIG. 3. The wall 20 carries an approximately U-shaped rimmed opening 22 that is engaged by the pivot peg 17. This means that any heat transfer from the operator panel 4 to either of the pivot pegs can occur only through the linear contact zone between the pivot peg 17 and the rimmed opening 22. As shown in the drawing, it is practical to make the horizontal width w of the rimmed opening 22 somewhat larger than the diameter d of the pivot peg 17, so that the contact between the rimmed opening 22 and the pivot peg 17 is limited to a single contact line. The horizontal play can also be made larger, e.g., in order to allow an angled position of the operator panel in relation to the balance housing.

In order to reduce heat conduction, it is further advantageous to use a heat-insulating material, particularly a polymer, for the rimmed opening 22, the pivot peg 17, support arm 18 and/or the cover plate 15. It is to be understood that the arrangement on the right side (in FIG. 2) is analogous, except for the absence of cable 19, but it is also possible to provide an additional cable on the right side. It is further understood that the illustrated arrangement could also be reversed in the sense that the axle or the pivot pegs 17 could be part of the operator panel while the rimmed opening 22 could be incorporated as a part of the cover plate 15.

Due to the relatively large vertical play between the inside of the rimmed opening 22 and the pivot peg 17, a level adjustment of the balance housing by means of the leveling foot 11 will not interfere with the fixed height of the operator panel 4 that is determined by the feet 8. The U-shape of the rimmed opening 22 makes it easy to remove or exchange the operator panel 4, and the removable configuration of the cover plate 15 with the screws 16 serves the same purpose. It is clear, however, that the convenient separation of the operator panel could also be provided in different ways, e.g., if one of the pivot pegs 17 could be pushed back against the force of an axial compression spring so that it would snap into place in the rimmed opening 22. Also, particularly with a U-shaped configuration of the rimmed opening 22, there could be a single, full-length axle 17 extending along the geometric axis A. In this case, the cable 19 could exit radially from the axle 17. If necessary, the axle 17 (or at least a pivot peg 17) could be rotatably fastened in the support arm 18.

FIG. 3 also illustrates how the cable 19, after it leaves the pivot peg 17, can be kept away from the support surface 24 on which the two feet 8 are resting. Close to the cable exit from the pivot peg 17, the free cable end 19' is held in place by the wall 20 where the cable enters into the operator panel 4.

It is practical (though not shown in the drawing) to provide a hollow space in the bottom of the operator panel 4 to store a wound-up length of cable and to enclose the space with a bottom cover plate. The bottom cover plate can be configured to simultaneously serve as a retaining device for the pivot means.

Of course the operator panel can be removed from the balance. The signals can be sent through a cable as well as in a wireless mode, e.g., by opto-electronic transmission. For applications requiring a quick and complete separation of the operator panel from the remainder of the balance while using a cable the person skilled in the art will foresee a connector pair.

The primary advantages associated with the invention are that the separation of the operator panel from the body of the balance reduces or eliminates thermal effects that are harmful to the weighing results so that the balance will perform with a higher degree of accuracy.

| List of Reference Numbers |
| --- |
| 1 Balance |
| 2 Draft shield |
| 3 Vertical post |
| 4, 4' Operator panel |
| 5 Weighing pan |
| 6 Push keys |
| 7 Display screen |
| 8 Feet |
| 9 Front side of balance housing |
| 10 Latch |
| 11 Leveling foot |
| 12 Pin |
| 13 Frame of 2 |
| 14 Switch |
| 15 Cover plate |
| 16 Screws |
| 17 Pivot peg |
| 18 Support arm |
| 19 Cable |
| 20 Wall of 4 |
| 21 Balance housing |
| 22 Rimmed opening |
| 23 Printed circuit board |
| 24 Support surface |

What is claimed is:

1. A balance comprising a balance housing and an operator panel constituted as two parts that are movable in relation to each other; wherein the operator panel is connected to the balance housing through a pivoting arrangement of mutually engaged armatures that are provided on the operator panel and the balance housing; wherein the operator panel is rotatable about a pivot axis from a working position, in which the operator panel projects forward from the balance housing, into a rest position; wherein said pivot axis runs essentially in a horizontal direction in front of the balance housing; and wherein the armatures cooperate with each other as a hinge and have a degree of play in at least one radial direction in relation to the pivot axis, thereby allowing the pivot axis to assume a tilted position.

2. The balance according to claim 1, wherein the pivoting arrangement comprises at least one peg-shaped axle arranged on one of said two parts and a rimmed opening on the other of said two parts, and wherein said degree of play exists between the at least one peg-shaped axle and the rimmed opening.

3. The balance according to claim 2, wherein said degree of play is provided at least in a vertical direction.

4. The balance according to claim 2, wherein the peg-shaped axle is part of the balance housing, and the rimmed opening is part of the operator panel.

5. The balance according to claim 2, wherein the rimmed opening is approximately U-shaped, so that the peg-shaped axle is separable from the rimmed opening through the open side of the U.

6. The balance according to claim 2, comprising a heat-insulating material in the area of the mutually engaged armatures.

7. The balance according to claim 1, wherein the pivoting arrangement allows a vertical displacement of the operator panel in addition to the rotation, so that the balance housing can be independently adjusted to a level position by means of a leveling device without being constrained by the operator panel, and wherein further the operator panel comprises at least one foot which, in said operating position, rests on a support surface.

8. The balance according to claim 1, wherein a switch is provided, said switch being operable to influence an operating state of electric circuit components in the balance when the operator panel is rotated into the rest position.

9. The balance according to claim 1, wherein a locking device is provided for at least one of the operating position and the rest position of the operator panel.

10. The balance according to claim 1, wherein the pivoting arrangement comprises a releasable mechanical connection, and wherein further the balance can be used in an alternative working arrangement where the operator panel cooperates with the rest of the balance while being separated from the balance housing.

11. The balance according to claim 1, wherein a cable connects the balance housing to the operator panel, said cable exiting from the balance housing in the area of the pivoting arrangement.

12. The balance according to claim 11, wherein the peg-shaped axle is arranged on the balance housing and the cable is routed along a path that runs through, and is at least approximately coaxial to, the peg-shaped axle.

13. The balance according to claim 11, wherein the cable exits from a plate-shaped closure element which is connected to the balance housing by a releasable fastener arrangement allowing the closure element to be removed from the balance housing.

14. The balance according to claim 11, wherein the cable has a plug connection in the area of the pivoting arrangement.

15. The balance according to claim 11, wherein the operator panel has a bottom that comprises a cable storage space.

16. The balance according to claim 10, wherein the operator panel and the balance housing comprise sending/receiving units attuned to each other for a wireless signal communication between the operator panel and the balance housing.

* * * * *